US011852798B2

(12) United States Patent
Ogien et al.

(10) Patent No.: US 11,852,798 B2
(45) Date of Patent: Dec. 26, 2023

(54) SYSTEMS AND METHODS FOR PERFORMING MICROSCOPIC ANALYSIS OF A SAMPLE

(71) Applicant: DAMAE MEDICAL, Paris (FR)

(72) Inventors: Jonas Ogien, Paris (FR); Olivier Levecq, Pairs (FR)

(73) Assignee: DAMAE MEDICAL, Paris (FR)

( * ) Notice: Subject to any disclaimer, the term of this patent is extended or adjusted under 35 U.S.C. 154(b) by 0 days.

(21) Appl. No.: 18/005,305

(22) PCT Filed: Jul. 6, 2021

(86) PCT No.: PCT/EP2021/068661
§ 371 (c)(1),
(2) Date: Jan. 12, 2023

(87) PCT Pub. No.: WO2022/017784
PCT Pub. Date: Jan. 27, 2022

(65) Prior Publication Data
US 2023/0350186 A1    Nov. 2, 2023

(30) Foreign Application Priority Data
Jul. 22, 2020   (FR) ..................................... 2007700

(51) Int. Cl.
*G02B 21/36*    (2006.01)
*G02B 21/06*    (2006.01)

(52) U.S. Cl.
CPC .......... *G02B 21/365* (2013.01); *G02B 21/06* (2013.01)

(58) Field of Classification Search
CPC .............................. G02B 21/365; G02B 21/06
USPC ....... 348/79; 355/77; 356/450, 521; 382/128
See application file for complete search history.

(56) References Cited

U.S. PATENT DOCUMENTS 5,220,403 A * 6/1993 Batchelder ......... G01N 21/9505
356/450
5,805,342 A * 9/1998 Gravely ................. H04N 23/40
382/128
(Continued)

FOREIGN PATENT DOCUMENTS

FR        2814247 A1     3/2002
WO    2012004388 A1     1/2012
(Continued)

OTHER PUBLICATIONS

International Search Report issued in Application No. PCT/EP2021/068661 dated Oct. 11, 2021 (5 pages).
(Continued)

*Primary Examiner* — Jayanti K Patel
*Assistant Examiner* — Richard B Carter
(74) *Attorney, Agent, or Firm* — Osha Bergman Watanabe & Burton LLP

(57) ABSTRACT

The present description relates to a system for microscopic analysis of a sample that includes a microscopic analysis path and a sighting path. The microscopic analysis path notably includes an illumination path that illuminates the sample through a microscope objective of given nominal numerical aperture in a given field of view and a detection path including the microscope objective, and that detects in the field of view and according to a detection pattern, a light beam emitted by the sample in response to the illumination of the sample. The sighting path includes the microscope objective, a device for full field illumination of the sample, a two-dimensional detector, one or more imaging elements forming, with the microscope objective, a full field imaging device that forms a surface reflection sighting image of the sample of a given effective field encompassing the field of view.

20 Claims, 11 Drawing Sheets

(56) References Cited

U.S. PATENT DOCUMENTS

| | | | |
|---|---|---|---|
| 6,133,986 A * | 10/2000 | Johnson | G03F 7/70091 355/77 |
| 7,864,996 B2 | 1/2011 | Hemmer et al. | |
| 9,557,549 B2 * | 1/2017 | Yaqoob | G02B 21/365 |
| 2011/0075928 A1 * | 3/2011 | Jeong | G02B 27/58 356/521 |
| 2013/0182096 A1 * | 7/2013 | Boccara | G02B 21/16 348/79 |

FOREIGN PATENT DOCUMENTS

| | | |
|---|---|---|
| WO | 2015092019 A1 | 6/2015 |
| WO | 2017139712 A1 | 8/2017 |

OTHER PUBLICATIONS

Written Opinion issued in Application No. PCT/EP2021/068661 dated Oct. 11, 2021 (6 pages).

M. Rajadhyaksha et al., "In vivo confocal scanning laser microscopy of human skin II: Advances in instrumentation and comparison with histology", J Invest Dermatol, 1999 (11 pages).

K. König et al., "High-resolution multiphoton tomography of human skin with subcellular spatial resolution and picosecond time resolution," J. Biomed. Opt. 8, 432-439, 2003 (8 pages).

Schmitt et al., "Subsurface Imaging of Living Skin with Optical Coherence Microscopy", Dermatology 1995;191:93-98 (6 pages).

Y. Chen et al. "High-resolution line-scanning optical coherence microscopy", Optics Letters, vol. 32, No. 14, 1971-1973, 2007 (3 pages).

J. Schleusener et al., "Raman spectroscopy for the discrimination of cancerous and normal skin", Photon Lasers Med 2015 (17 pages).

E. Drakaki et al. "Spectroscopic methods for the photodiagnosis of nonmelanoma skin cancer", Journal of Biomedical Optics 18(6), 061221, Jun. 2013 (11 pages).

Z. Wu et al. "Precise in vivo tissue micro-Raman spectroscopy with simultaneous reflectance confocal microscopy monitoring using a single laser", Optic Letters, vol. 44, No. 6, Mar. 15, 2019 (4 pages).

E. Beaurepaire et al. "Full-field optical coherence microscopy", Optic Letters, vol. 23, No. 4, pp. 244-246, Feb. 15, 1998 (3 pages).

* cited by examiner

SYSTEMS AND METHODS FOR PERFORMING MICROSCOPIC ANALYSIS OF A SAMPLE

TECHNICAL FIELD OF THE INVENTION

The present description relates to systems and methods for microscopic analysis of a sample and relates in particular to the microscopic analysis of a biological tissue, in particular skin.

PRIOR ART

In the context of a dermatological examination in particular, it is known to carry out a dermoscopic examination, that is to say an observation of the surface of the skin using a magnifying optical instrument, and then to carry out a local microscopic analysis according to the observations made on the wide-field image obtained by the dermoscopic examination.

The microscopic analysis comprises, for example, microscopic imaging or spectroscopic analysis.

Among the imaging techniques, there are known in particular, and in a non-limiting manner, confocal microscopy techniques such as, for example, the technique described in Rajadhyaksha et al. [Ref. 1] or K. Konig et al. [Ref. 2] for nonlinear microscopy. Also known are techniques of optical coherence tomographic microscopy (OCM), in the time domain (time domain OCM) or in the frequency domain (frequency domain OCM). The known OCM techniques include techniques that combine optical coherence tomography and confocal microscopy (see, for example, Schmitt et al. [Ref. 3]) in order to improve lateral resolution.

More specifically, the patent application WO2015092019 [Ref. 4] describes a technique of visualizing the internal structure of a semi-transparent object arranged at the focus of a microscope objective, for example a biological tissue, in order to obtain vertical sections or B-scans orthogonal to the surface of the object, at a high rate (several sections per second), with high spatial resolution, that is to say of the order of 1 μm, both axially and laterally, and a satisfactory depth of penetration, of the order of a millimeter. This technique is based on optical coherence microscopy but has a confocal filtering configuration that is linear or one-dimensional (in one direction); for this, the illumination line is optically conjugated, in particular by means of the microscope objective, with a linear detector, the detection area of which has a width substantially identical to a width of the image of the line, resulting in a spatial filtering of a region of the object that is to be observed. Such a technique is thus known as line-field confocal optical coherence tomography (LC-OCT).

The article by Y. Chen et al. [Ref. 5] has also proposed a line-scanning optical coherence tomographic microscopy device, but one in which a sample is moved in a plane perpendicular to an optical axis of the microscope objective, and in a direction perpendicular to the illumination line, making it possible to form en-face images of the sample (or C-scans).

Among the techniques for spectroscopic analysis of a sample, and in particular of a biological tissue such as skin, there is known for example, and in a non-limiting manner, Raman spectroscopy, which makes it possible to form a molecular fingerprint of biological tissues, as described for example in Schleusener et al. [Ref. 6]. The review article by E. Drakaki et al. [Ref. 7] generally presents different spectroscopy techniques applied to the microscopic analysis of skin.

All of the microscopic analysis techniques described above, whether for imaging or for spectroscopy, use a microscope objective having a considerable nominal numerical aperture, typically greater than or equal to 0.5, for a given field of view, typically of between about 0.2 mm and about 1.5 mm.

In practice, in order to obtain relevant information during the microscopic analysis, it is important for the practitioner to find, during the microscopic analysis, the zone that appears to him to be suspect in the image obtained during the dermoscopic examination.

However, precisely finding in microscopic analysis a suspect zone that has been identified in dermoscopy is a complex matter, because the images on which it is possible to rely for sighting are obtained on much smaller fields than in dermoscopy, and they have a very different appearance. This is even more critical when the microscopic analysis does not produce images, such as in Raman microspectroscopy for example.

Different solutions have been proposed to allow a practitioner to identify, on the dermoscopic image, the field of analysis for the microscopic analysis.

The patent application WO2017139712 [Ref. 8] describes, for example, a system which combines confocal microscopy (or reflectance confocal microscopy (RCM)) and wide-field dermoscopy (WFD). For this, a micro-camera is directly integrated in the microscope objective in order to form a surface image in wide-field reflection. However, such a system is complex to manufacture and to integrate; moreover, the images obtained by the micro-camera are of poor quality.

The U.S. Pat. No. 7,864,996 [Ref. 9] describes a confocal imaging system coupled with a dermatoscope. The dermatoscope is mounted on a module fixed to the skin and makes it possible to image the same zone as the confocal microscope, which can be fixed on the same module. The acquisition of a dermoscopic image (or "macroscopic" image) is performed, followed by the acquisition of confocal images. A precise correlation between the images is made in order to represent, on the dermoscopic image, the position of the image formed by the confocal imaging system. However, the system thus described requires an additional module for fixing two separate probes, and it may be difficult for this module to be fixed at any location on the skin. In addition, a complex procedure must be followed for the acquisition of the images in order to obtain the correlation of the dermoscopic and confocal images.

In the case of Raman microspectroscopy, Z. Wu et al. [Ref 10] describe how to acquire and localize micro-Raman signals in tissues by means of reflectance confocal microscopy imaging, and using a single laser source. However, a confocal image is less easy to use, as a reference image for a practitioner, than a dermoscopic image.

The present description proposes microscopic analysis devices and methods allowing a user to locate with precision, and by means of a simple acquisition method, the field of the microscopic analysis in a wide-field surface reflection image, in which the image quality is close to the quality of a dermoscopic image.

SUMMARY OF THE INVENTION

In the present description, the term "comprise" signifies the same thing as "include", "contain", and is inclusive or open and does not exclude other elements which are not described or shown. Moreover, in the present description, the term "about" or "substantially" is synonymous with (signifies the same thing as) an upper and/or lower margin of 10%, for example 5%, of the respective value. According to a first aspect, the present description relates to a system for microscopic analysis of a sample, comprising:

a microscopic analysis path comprising:
  a microscope objective of given nominal numerical aperture in a given field of view;
  an illumination path configured to illuminate the sample through the microscope objective according to a first illumination pattern and in a first spectral band;
  a detection path comprising said microscope objective, said detection path being configured to detect in said field of view, and according to a detection pattern, a light beam emitted by the sample in response to said illumination of the sample, and to generate a detection signal;
  a processing unit configured to generate information on microscopic analysis of the sample from said detection signal;
a sighting path comprising:
  said microscope objective;
  a full-field illumination device configured to illuminate the sample in a second spectral band;
  a two-dimensional detector;
  one or more imaging elements forming, with said microscope objective, a full-field imaging device configured to optically conjugate a given effective field of the sample encompassing said field of view with a detection area of the two-dimensional detector, and to form a sighting image in surface reflection of said effective field;
a beam splitter element arranged upstream of the microscope objective in order to separate the analysis path and the sighting path;
a display module configured to show said sighting image and, on said sighting image, an image element indicating the position of said detection pattern. In the present description, the term "field of view" of the microscope objective refers to a region of a focal plane of the microscope objective, located in the object space (sample space) for which the manufacturer guarantees a nominal numerical aperture. A nominal numerical aperture is, for example, between about 0.1 and about 1.4, for example between about 0.5 and about 0.9. The field of view can be defined by a circle with a diameter of between about 100 µm and about 5 mm, for example between about 500 µm and about 1.5 mm.

The term "effective field" of the microscope objective is a field in the object space (sample space) which is included in a total field of the microscope objective, which encompasses said field of view and whose dimensions are limited by the full-field imaging device of the sighting path. The effective field can be defined by a circle with a diameter of between about 1 mm and about 10 mm, for example between about 2 mm and about 5 mm.

In the present description, the illumination pattern depends on the illumination path of the microscopic analysis path and can comprise an illumination point, an illumination line or an illumination surface, for example a rectangular surface resulting from the scanning of an illumination point or of an illumination line. An illumination point is more precisely defined as the diffraction pattern resulting from the focusing, by the microscope objective of the microscopic analysis path, of a collimated light beam incident on said objective. The illumination pattern can also comprise an illumination surface which does not result from scanning, for example a surface with circular geometry, in the case of a full-field microscopic analysis path. The light beam emitted by the sample in response to the illumination of the sample can be a reflected beam, a backscattered beam, or a beam resulting from an emission process at another wavelength (for example fluorescence, Raman scattering, etc.).

Moreover, the detection pattern is included in the field of view and is included in the illumination pattern or is of the same order of magnitude, and depends on the detection path of the microscopic analysis path. The detection pattern can comprise a detection point, a detection line or a detection surface, for example a rectangular surface resulting from the scanning of a line, or, in the case of a full-field microscopic analysis path, a surface optically conjugated with a detection area of a detector. A detection point is here defined in the object space by an elementary zone optically conjugated with an elementary detector of a detector of the detection path of the microscopic analysis channel.

The applicant has shown that the system for microscopic analysis of a sample according to the first aspect allows a user to precisely locate the field of the microscopic analysis in a wide-field surface reflection image or "sighting image". Said wide-field surface reflection image can present an image quality close to the quality of a dermoscopic image due to the fact that the sighting path is moved apart. However, the system retains very good compactness compared to the systems of the prior art that require two probes ([Ref 9] for example).

According to one or more exemplary embodiments, the full-field imaging device of the sighting path has, in the object space of the microscope objective, a numerical aperture strictly lower than the nominal numerical aperture of the microscope objective. It is then possible for the sighting path to benefit from an effective field greater than the field of view while limiting aberrations and potential vignetting, while at the same time maintaining limited dimensions for the imaging element(s) forming the full-field imaging device. The quality of the sighting image is therefore further improved.

According to one or more exemplary embodiments, said sighting path further comprises a diaphragm making it possible to limit the numerical aperture of the full-field imaging device. According to other exemplary embodiments, it is directly one of said imaging elements forming the full-field imaging device that is configured to additionally form a diaphragm for limiting the numerical aperture of the full-field imaging device.

According to one or more exemplary embodiments, the full-field imaging device of said sighting path is adjustable in focusing. This makes it possible to form a sighting image in surface reflection of the sample even when the microscopic analysis path images deep into the sample (case of OCM imaging for example).

According to one or more exemplary embodiments, the full-field illumination device of the sighting path comprises a plurality of light sources arranged on a periphery of a distal face of the microscope objective, that is to say the face of the microscope objective in the sample space. This configuration permits direct illumination of the sample. Alternatively, the full-field illumination device of the sighting path can comprise a source arranged upstream of the microscope objective and a beam splitter element, for example a splitter cube, configured to direct an illumination beam through the microscope objective, toward the sample.

According to one or more exemplary embodiments, the second spectral band differs at least partially from the first spectral band, and said sighting path comprises means for reducing the light power at least in said first spectral band. In some cases indeed, an illumination beam of the sample in the illumination path of the microscopic analysis path can have a light power strong enough to dazzle the detector of the sighting path. By reducing the light power at least in said first spectral band, such a risk of glare is limited.

According to one or more exemplary embodiments, the second spectral band differs at least partially from the first spectral band, and said beam splitter element comprises a plate or a dichroic cube, configured to separate the beams in each of said first and second spectral bands. The dichroic plate then forms means for reducing the light power in said first spectral band.

According to one or more exemplary embodiments, the microscopic analysis path comprises a device for scanning an illumination beam of the sample and a beam emitted by the sample in response to said illumination of the sample, and said beam splitter element forms part of the scanning device.

According to one or more exemplary embodiments, said image element indicating the position of said detection pattern comprises a graphic element determined by means of a prior calibration. This configuration is particularly advantageous in particular when the illumination pattern is not detected by the detector of the sighting path, for example either because the detector of the sighting path is not sensitive in the first spectral band or because the first spectral band in the sighting path is cut in order to limit glare. This configuration is also advantageous when the illumination pattern is difficult to identify in the sighting image, or if the detection pattern is substantially different from the illumination pattern.

According to one or more exemplary embodiments, said microscopic analysis path is a confocal and/or optical coherence tomographic imaging path, and said information on microscopic analysis of the sample comprises at least one image of the sample. For example, the microscopic analysis path is an optical coherence tomographic imaging path as described in the prior art and is configured to form B-scans, C-scans (or en-face images) of the sample or 3D images of the sample. In known manner, a cross-sectional image of the sample, called a B-scan, is an image formed in a plane parallel to the optical axis of the microscope objective; a cross-sectional image of the sample called a C-scan, or en-face image, is an image formed in a plane perpendicular to the optical axis of the microscope objective, and a 3D image of the sample results from the acquisition of a plurality of B-scan images or C-scans images and thus permits an analysis of the sample in a volume.

According to one or more exemplary embodiments, said microscopic analysis path is a spectroscopic analysis path, and said information on microscopic analysis of the sample comprises at least one spectrum of said light beam emitted by the sample at at least one point of the sample. According to a second aspect, the present description relates to a method for analysis of a sample, comprising:
 a microscopic analysis of the sample by means of a microscopic analysis path comprising a microscope objective of given nominal numerical aperture in a given field of view, said microscopic analysis comprising:
  illuminating the sample through the microscope objective according to a first given illumination pattern and in a first spectral band;
  detecting in said field of view, and according to a detection pattern, a light beam emitted by the sample in response to said illumination of the sample in order to form a detection signal;
  processing said detection signal in order to generate information on microscopic analysis of the sample;
 the formation of a sighting image in surface reflection of a given effective field of the sample encompassing said field of view, by means of a sighting path comprising said microscope objective, a two-dimensional detector, one or more imaging elements configured to form with said microscope objective a full-field imaging device, the formation of the sighting image comprising:
  full-field illumination of the sample in a second spectral band;
  optical conjugation of the effective field of the sample with a detection area of the two-dimensional detector, by means of said full-field imaging device, in order to form said sighting image;
 displaying said sighting image and, on said sighting image, displaying an image element indicating the position of said detection pattern.

According to one or more exemplary embodiments, the microscopic analysis of the sample and the formation of a sighting image are carried out continuously, which entails that the sources of illumination of the analysis path and of the sighting path are both in operation when the microscopic analysis system is in use. This configuration is possible in the case in particular where an illumination beam of the sample in the microscopic analysis path is invisible or very attenuated in the sighting path, or more generally when the illumination beam of the sample in the microscopic analysis path does not disturb the acquisition of the sighting image.

According to one or more exemplary embodiments, the method for analysis of a sample according to the first aspect comprises:
 a first step of forming a sighting image of the sample without illumination of the microscopic analysis path,
 the detection of an analysis zone of interest in the sighting image of the sample, and
 the microscopic analysis of said sample in said zone of interest.

This configuration is interesting in particular in the case where an illumination beam of the sample in the microscopic analysis path can disturb the detection in the sighting path but the illumination of the sample in the sighting path does not disturb the detection in the microscopic analysis path.

It is also possible to turn off the illumination of the sighting path during the microscopic analysis of the sample if the illumination of the sample in the sighting path disturbs the detection in the microscopic analysis path. In this case, the microscopic analysis of the sample and the formation of a sighting image are carried out successively.

According to one or more exemplary embodiments, the microscopic analysis of the sample comprises confocal and/or optical coherence tomographic imaging of the sample, making it possible to form B-scan, C-scan or 3D images of the sample.

According to one or more exemplary embodiments, the method further comprises the display of at least one of said B-scan and C-scan images, and/or, in the case of the formation of a 3D image, the display of at least one of said B-scan and C-scan images extracted from the 3D image.

For example, the microscopic analysis of the sample comprises the formation of B-scan images with a given imaging rate, and said imaging rate is synchronized with a rate of acquisition of sighting images. As the acquisition of B-scan images may require scanning of the illumination beam deep in the sample, for example by means of an axial displacement of the microscope objective, the synchronization ensures that the sighting images are acquired with an identical position of the microscope objective with respect to the surface of the sample.

According to one or more exemplary embodiments, the microscopic analysis of the sample comprises a spectroscopic analysis of the sample.

According to one or more exemplary embodiments, the method according to the second aspect comprises a prior calibration step making it possible to determine, for said image element, a graphic element indicating the position of said detection pattern.

According to one or more exemplary embodiments, the method according to the second aspect further comprises the display of a marker superimposed on said image element of the sighting image, said marker allowing a user to target a point of interest in the detection pattern. Thus, in certain embodiments, a user is able to position the marker on said image element in order to obtain microscopic analysis information in the sample, at the level of said marker. In certain exemplary embodiments, a user is also able to select a point of interest at the level of the microscopic analysis information and see the marker position itself at the corresponding location of the image element. Thus, for example, in the case where the microscopic analysis of the sample comprises the formation of B-scan and/or C-scan images of the sample, a user will be able to target a point in one of said images displayed simultaneously with the sighting image, for example by means of a reticle, and will be able to see the marker position itself on the sighting image, the marker corresponding to the projection of the targeted point on the surface of the sample. The user will also be able to position the marker on the target image and see a reticle position itself on one of said images, in a position corresponding to that of the marker.

According to one or more exemplary embodiments, the sample is a biological tissue, for example skin.

BRIEF DESCRIPTION OF THE FIGURES

Other advantages and features of the invention will become clear on reading the description, illustrated by the following figures.

DETAILED DESCRIPTION OF THE INVENTION

In the following detailed description, many specific details are set forth in order to provide a more in-depth understanding of the present description. However, it will be apparent to a person skilled in the art that the present description can be implemented without these specific details. In other cases, well-known features have not been described in detail, so as to avoid unnecessarily complicating the description.

Moreover, in order to ensure better clarity, the features are not shown to scale in the figures.

Figure 1A:
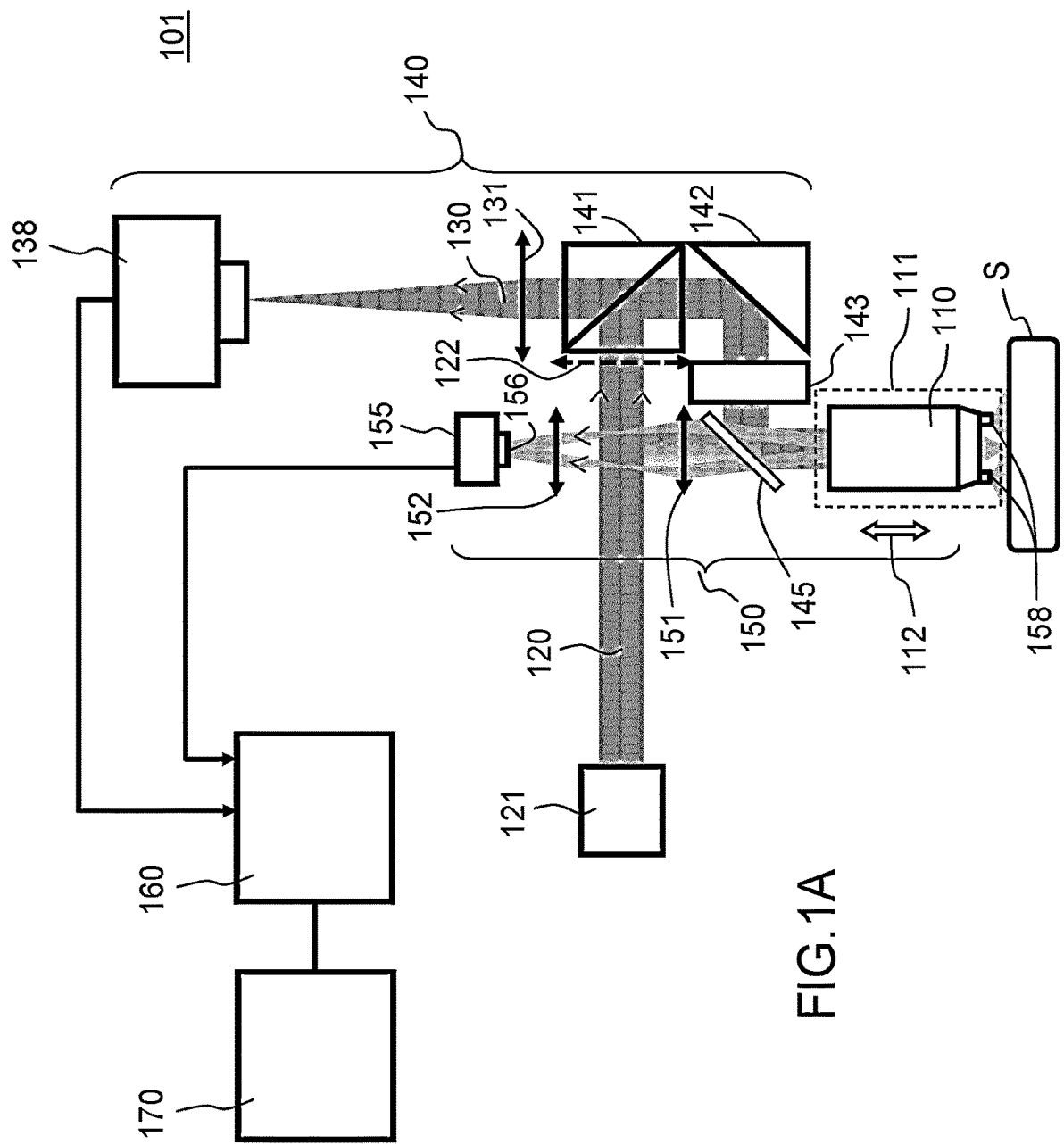
FIG. 1A: a diagram illustrating a first example of a system for microscopic analysis of a sample according to the present description.

FIG. 1A shows a first system 101 for microscopic analysis of a sample S, in which the microscopic analysis path is a confocal imaging path with scanning (point or line), where the imaging may possibly be non-linear imaging.

The microscopic analysis system 101 comprises a microscope objective 110 of given nominal numerical aperture NA in a given field of view, a microscopic analysis path 140, which is a scanning confocal imaging path, and a sighting channel 150.

In this example, the microscopic analysis path 140 comprises an illumination path 120 configured to illuminate the sample through the microscope objective 110 according to a given illumination pattern and in a first spectral band, and a detection path 130 comprising said microscope objective 110, said detection path being configured to detect in the field of view, and according to a given detection pattern, a light beam emitted by the sample in response to said illumination of the sample. The microscopic analysis path 140 also comprises a processing unit 160 and a display module 170.

In this example, the illumination path 120 of the microscopic analysis path 140 comprises an illumination source 121 and a cylindrical lens or deflection mirror 122 (optional). The illumination path also comprises a splitter element 141 (splitter cube or splitter plate) and a reflecting element 142 (optional) which are configured to send an illumination beam, emitted by the illumination source 121, toward the microscope objective 110, and also a device 143 for scanning the illumination beam, configured to scan the illumination beam along one or two dimensions. A splitter element 145 is configured to separate the sighting path 150 and the microscopic analysis path 140. The splitter element 145 is, for example, a splitter cube or a splitter plate having a reflection/transmission ratio of between 10/90 and 90/10; it can be about 50/50. Moreover, a platform 111 (optional) rigidly connected to the microscope objective 110 permits an axial displacement 112 of the objective with respect to the sample. The illumination source 121 can comprise, for example, a source of emission of coherent (spatially), monochromatic and collimated light. Optics and/or spatial filters (not shown) can make the source collimated and/or coherent and/or monochromatic. The wavelength of the source depends on the application. For confocal microscopy using reflection of the illumination beam off the sample, and applied to imaging of the skin, a typical wavelength of the illumination source is about 800 nm. For confocal microscopy using fluorescence or nonlinear microscopy, the wavelength can be adapted to the wavelength of fluorescence excitation or of nonlinear emission of the sample. Depending on the applications, a polychromatic source can also be used. Moreover, in nonlinear microscopy, for example in CARS or SRS microscopy, the source 121 can comprise a plurality of distinct emission sources (spatially coherent, monochromatic and collimated), which are combined via a cube or a plate. In the case of fluorescence/nonlinear microscopy, a dichroic splitter element 141 will advantageously be used which reflects the excitation wavelength and transmits the emission wavelength of the sample (or vice versa). The cylindrical optical element 122 is optional and permits microscopy with illumination along a line (so-called "line-field" microscopy).

The illumination beam scanner 143 can be configured for two-dimensional scanning in order to form an image from the scanning of an illumination point. In the case of a "line-field" system with a cylindrical lens or deflection mirror 122, the illumination beam scanner 143 will be able to be configured for one-dimensional scanning. The scanning device can comprise one or more scanning elements chosen from among the following elements: galvanometric mirrors, polygonal mirrors, electrical or acoustic-optical deflection systems, or a combination of these various elements (in the case of bi-dimensional scanning). The scanning device can also include optics in order to conjugate at least one of said scanning elements with an entrance pupil of the microscope objective 110, for example in order to avoid vignetting. In this example, the detection path 130 of the microscopic analysis path 140 comprises a detector 138, the microscope objective 110, the scanning device 143, and the reflecting or partially reflecting elements 145, 142 (optional), 141 configured to send a beam, emitted by the sample S in response to said illumination of the sample, toward the detector 138. In this example, the detection path 130 further comprises a lens 131 configured to optically conjugate, with the microscope objective, a plane of the sample S with a detection area of the detector 138. The lens 131 or "tube lens" can of course be composed of several optical lenses and can also be replaced by one or more reflecting elements, for example a spherical or parabolic mirror.

The detector 138 comprises an optical sensor with a detection area and can also include spatial filters for confocal detection, if this is not ensured by the detection area dimensions, and/or spectral filters to limit the wavelength band detected to the emission band of the sample in the case of a fluorescence/nonlinear microscopy system. The sensor can comprise an elementary detection surface (e.g. a photodiode) in the case of a point scanning system, a one-dimensional sensor (e.g. a linear camera) in the case of a "line-field" system, or a two-dimensional sensor of which only a region of interest is considered in order to serve as an elementary detection area or one-dimensional sensor. It will be noted that a two-dimensional sensor can also be used in a "conventional" way if a second scanning device similar to device 143 is placed upstream of the sensor. The processing unit 160 receives, in a known manner, a detection signal generated by the detector 138 and reconstructs microscopic images from the detection signal, for example a 2D en-face image from a detection signal resulting from scanning of a point or line illumination pattern, for example.

The processing unit is connected to a display module 170 configured to represent a sighting image and, on the sighting image, an image element indicating the position of the detection pattern, as will be illustrated in more detail below. The processing unit can also be connected to a storage unit (not shown) for storing the images and/or videos generated.

The microscopic analysis system 101 further comprises the sighting path 150. As is illustrated in FIG. 1A, the sighting path 150 comprises the microscope objective 110, the beam splitter 145, a full-field illumination device 158 configured to illuminate the sample in a second spectral band, a two-dimensional detector 155 with a detection area 156, and one or more imaging elements represented in FIG. 1A by the elements 151, 152 configured to form, with said microscope objective 110, a full-field imaging device which optically conjugates a given effective field of the sample with the detection area 156 of the two-dimensional detector 155. The sighting path thus makes it possible to form a sighting image in surface reflection of the effective field which, as will be described in more detail below, encompasses the field of view of the microscope objective.

In this example, the full-field illumination device 158 comprises a plurality of light sources which are arranged on a periphery of a distal face of the microscope objective 110 and allow direct illumination of the sample S. The light sources are, for example, light-emitting diodes emitting at wavelengths of between about 400 nm and about 800 nm. Of course, other illumination devices are possible, for example a source arranged upstream of the microscope objective and a beam splitter element, for example a splitter cube, configured to direct an illumination beam through the microscope objective, toward the sample.

As is shown in FIG. 1A, the two-dimensional detector 155 is connected, in this example, to the processing unit 160 for the acquisition and display of the sighting image on the display module 170.

In operation, the sighting path 150 thus makes it possible to generate a sighting image in surface reflection of the sample with a larger field than the field of view of the microscope objective. Moreover, an image element which indicates the position of the detection pattern is shown on the sighting image, it being possible for the detection pattern to be a point, a line or a surface. It is thus possible for a user, for example a practitioner, to precisely identify the field of the microscopic analysis in the wide-field sighting image.

Figure 1B:
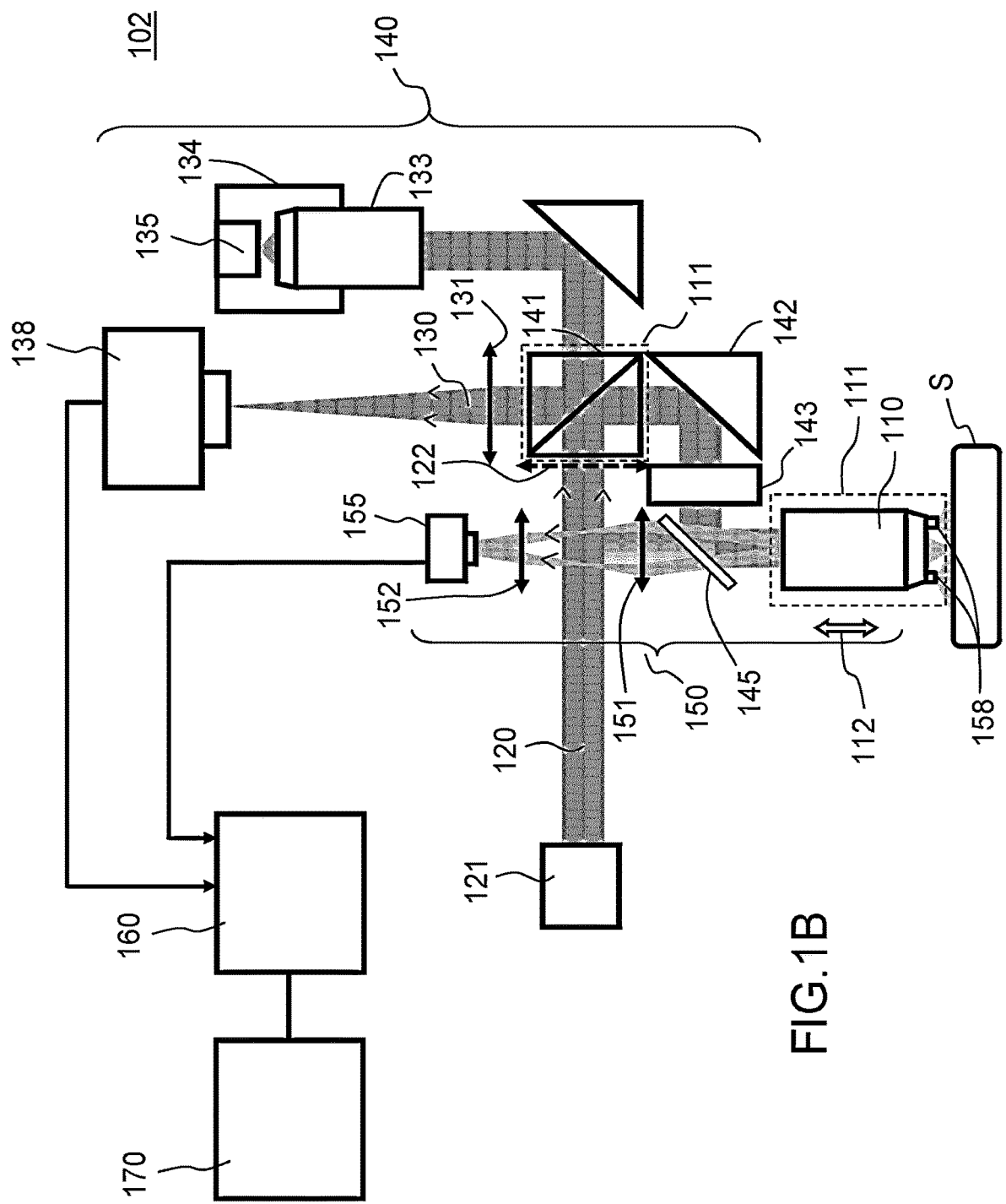
FIG. 1B: a diagram illustrating a second example of a system for microscopic analysis of a sample according to the present description.

FIG. 1B shows a second example of a system 102 for microscopic analysis of a sample S, in which the microscopic analysis path is an optical coherence tomographic (OCT) microscopy path, for example a confocal OCT channel, for example of the LC-OCT type as described, for example, in [Ref. 4] or [Ref. 5].

As in the preceding example, the microscopic analysis system 102 comprises a microscope objective 110 of given nominal numerical aperture (NA) in a given field of view, the microscopic analysis path 140, which is an optical coherence tomographic (OCT) path, the sighting channel 150, a processing unit 160, and a display module 170. In this example, the sighting path 150 may be similar to the sighting path described with reference to FIG. 1A, only the microscopic analysis path 140 being different. In the example of FIG. 1B, the microscopic analysis path 140 comprises an illumination path 120 configured to illuminate the sample through the microscope objective 110 according to a given illumination pattern. In this example, the illumination path comprises an illumination source 121, a cylindrical lens or deflection mirror 122 (optional), a splitter element 141 (splitter cube or splitter plate) and a reflecting element 142 (optional) which are configured to send an illumination beam, emitted by the illumination source 121, toward the microscope objective 110. In this example, the illumination path 120 also comprises a device 143 for scanning the illuminating beam, configured to scan the illumination beam along one or two dimensions, a splitter element 145 configured to separate the sighting channel 150 and the microscopic analysis channel 140, and (optionally) a platform 111 rigidly connected to the microscope objective 110 and (for example) to the splitter element 141, configured for an axial displacement 112 of the objective with respect to the sample.

The illumination source 121 can comprise, for example, a source of emission of coherent (spatially), polychromatic, collimated light. Optics and/or spatial filters (not shown) can make the source collimated and/or coherent and/or with a specific spectral distribution. The central wavelength of the source depends on the application, for example of between 600 nm and 1500 nm, and the spectral width for example between 50 nm and about 250 nm. In the case of an LC-OCT application as described for example in Ref. 4, the illumination source 121 can comprise, for example, and in a non-limiting way, a supercontinuum laser spectrally filtered by an optical fiber for an emission of about 800 nm and collimated by an off-axis parabolic mirror. In the case of an application to full-field tomographic imaging or FF-OCT (full-field OCT), as described for example in the article by E. Beaurepaire et al. [Ref. 11], the illumination source 121 can be chosen to be spatially non-coherent and to comprise means for full-field illumination of the sample, for example a Kohler illumination system. The cylindrical optical element 122 is optional and permits microscopy with illumination along a line (line-field microscopy).

The scanning device 143 for the illumination beam can be configured for one-dimensional or two-dimensional scanning of a point or a line in order to form, in a known manner, a cross-sectional image of the so-called B-scan sample, that is to say in a plane parallel to the optical axis of the microscope objective, a cross-sectional image of the sample called a C-scan, or en-face image, that is to say in a plane perpendicular to the optical axis of the microscope objective, or a 3D image of the sample resulting from the acquisition of a plurality of B-scan images or C-scan images. As before, the scanning device can comprise one or more scanning elements selected from among the following elements: galvanometric mirrors, polygonal mirrors, electrical or acousto-optical deflection systems, or a combination of these different elements (in the case of two-dimensional scanning). The scanning device can also include optics for conjugating at least one of said scanning elements with an entrance pupil of the microscope objective 110, for example in order to avoid vignetting.

The detection path 130 of the microscopic analysis path is configured to detect a light beam emitted by the sample in response to said illumination of the sample, according to a given detection pattern, but differs from the detection path of the microscopic analysis path illustrated in FIG. 1A. In particular, the detection path comprises an interferometer for implementation of optical coherence tomographic microscopy. More precisely, the interferometer comprises an object arm with the microscope objective 110, the scanning device 143 and the reflecting or partially reflecting elements 145, 142, 141, which are configured to send a beam, emitted by the sample S in response to said illumination of the sample, toward a detector 138.

The interferometer of the detection path further comprises a reference arm, separated in this example from the object arm by the splitter cube 141, and comprising in a known manner a microscope objective 133 (optional), for example similar to the microscope objective 110 in order to provide dispersion compensation, a dispersion compensation system (optional, not shown in FIG. 1B, especially in the case where there is no microscope objective 133), a reference mirror 135, a platform 134 (optional) configured for example to cause the reference mirror 135 to move when a modulation of the optical path on the reference arm is required. In this example, the detection path further comprises an objective 131 configured to optically conjugate, with the microscope objective, a plane of the sample S with a detection area of the detector 138.

As in the preceding example, the detector 138 comprises an optical sensor with a detection area, and it can also include spatial filters for confocal detection, if this is not ensured by the dimensions of the detection area, and/or spectral filters in order to limit the detected wavelength band. The sensor can comprise an elementary detection surface (e.g. a photodiode) in the case of a point scanning system, a one-dimensional sensor (e.g. a linear camera) in the case of a line-field system, or a two-dimensional sensor of which only a region of interest is considered in order to serve as an elementary detection area or as a one-dimensional sensor. In the case of an FF-OCT application, a two-dimensional sensor can be used conventionally.

In operation, interferences are created at the detection area of the detector 138 between the light coming from the reference arm and the light backscattered by the sample illuminated according to the illumination pattern, optionally and in a known manner with a modulation of the path length difference between the reference arm and the object arm of the sample, for the formation of tomographic images, in particular en-face images. The processing unit 160 receives, in a known manner, detection signals generated by the detector 138 and resulting from the detection of interferences, and it is configured for the reconstitution of microscopic images from the detection signals, for example images in 2D section (B-scan or C-scan). The processing unit 160 is connected to a display module 170 configured to represent the sighting image and, on the sighting image, an image element indicating the position of the detection pattern, as will be illustrated in more detail below. The processing unit can also be connected to a storage unit (not shown) for storing the images and/or videos generated.

Such a microscopic analysis path 140 thus functions as a known optical coherence tomographic microscopy channel from the prior art. Although a particular example is shown in FIG. 1B, a person skilled in the art will understand that the microscopic analysis system according to the present description applies to any assembly known from the prior art for optical coherence tomographic microscopy, and the optomechanical elements shown in FIG. 1B can be adapted accordingly.

According to exemplary embodiments, in the case of a microscopic analysis path suitable for the formation of vertical cross-sectional images of the sample (B-scan) by scanning a line in depth, the formation of B-scan images will be able to be synchronized with a rate of acquisition of the sighting images. Indeed, when the acquisition of B-scan images comprises scanning of the illumination beam in depth in the sample by means of a displacement of the microscope objective for example, the synchronization makes it possible to ensure that the sighting images are acquired with an identical position of the microscope objective with reference to the surface of the sample.

Figure 1C:
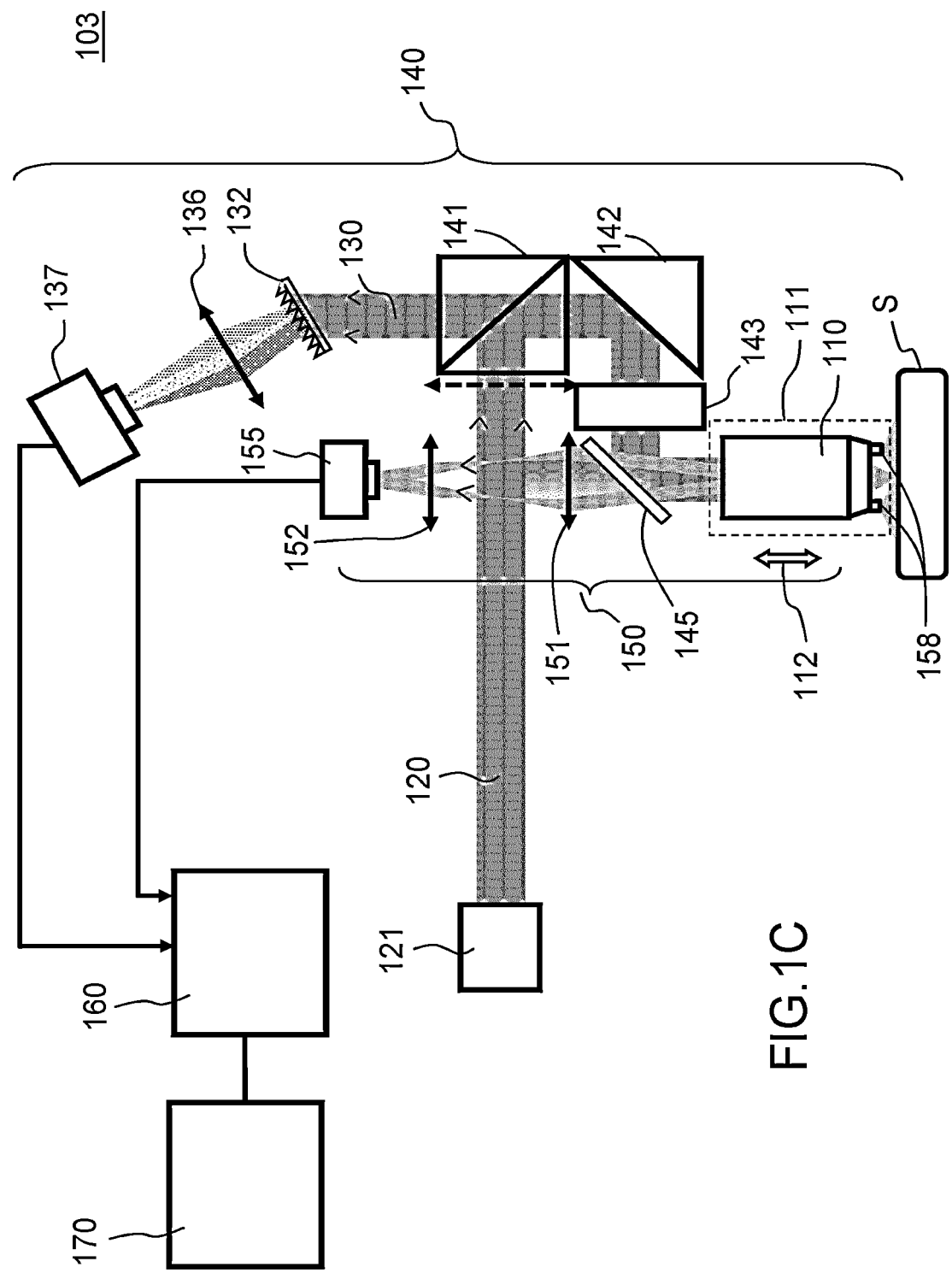
FIG. 1C: a diagram illustrating a third example of a system for microscopic analysis of a sample according to the present description.

FIG. 1C shows a third example of a system 103 for microscopic analysis of a sample S, in which the microscopic analysis path is a spectroscopy path, for example Raman spectroscopy.

As in the preceding examples, the microscopic analysis system 103 comprises a microscope objective 110 of given nominal numerical aperture NA in a given field of view, the microscopic analysis path 140, which is a spectroscopy path, and the sighting path 150.

In this example, sighting path 150 may be similar to the sighting path described with reference to FIG. 1A, only the microscopic analysis path 140 being different.

The microscopic analysis path 140 comprises an illumination path 120 comprising, in this example, an illumination source 121, a cylindrical lens or deflection mirror 122 (optional), a splitter element 141 (splitter cube or splitter plate) and a reflecting element 142 (optional), which are configured to send an illumination beam, emitted by the illumination source 121, toward the microscope objective 110. In this example, the illumination path 120 also comprises a scanning device 143 (optional) for the illumination beam, configured to scan the illumination beam along one or two dimensions, a splitter element 145 configured to separate the sighting path 150 and the microscopic analysis path 140, and (optionally) a platform 111 rigidly connected to the microscope objective 110 and configured for axial displacement 112 of the objective with respect to the sample.

The illumination source 121 can comprise, for example, a source of coherent (spatially), monochromatic and collimated light. A polychromatic source can also be used, for example in diffuse reflection micro-spectroscopy. Optics and/or spatial filters (not shown) can make the source collimated and/or coherent and/or monochromatic. The wavelength of the source depends on the application. In Raman microspectroscopy for example, applied to imaging of the skin, a typical wavelength of the illumination source can be between about 780 nm and about 830 nm.

The cylindrical optical element 122 is optional and permits microscopy with illumination along a line (line-field).

The detection path 130 of the microscopic analysis path is configured to detect a light beam emitted by the sample in response to said illumination of the sample, according to a given detection pattern, but differs from the detection path of the microscopic analysis path illustrated in FIG. 1A or in FIG. 1B. In particular, the detection path comprises, in addition to the microscope objective 110, the scanning device 143 (optional) and reflecting or partially reflecting elements 145, 142, 141, a spectrometer. The spectrometer comprises, in this example and in a known manner, a spectral dispersion element 132, for example a grating, an objective 133, and a detector 134, comprising a sensor with a one-dimensional or two-dimensional detection area. A two-dimensional sensor makes it possible, in a line-field configuration, to measure a spectrum for each point of the detection pattern (measurement of several spectra in parallel, each line of the 2D sensor thus corresponding to the spectrum of a point in the detection pattern). The processing unit 160 receives, in a known manner, detection signals generated by the detector 134 of the spectrometer for the reconstruction of spectroscopic signals at one or more points of the sample. The processing unit 160 is connected to a display module 170 configured to represent the sighting image and, on the sighting image, an image element indicating the position of the detection pattern, as will be illustrated in more detail below. The processing unit can also be connected to a storage unit (not shown) for storing the images and/or videos generated.

Such a microscopic analysis path 140 therefore functions as a spectroscopy path known from the prior art. Although a particular example is shown in FIG. 1C, a person skilled in the art will understand that the microscopic analysis system according to the present description applies to any assembly known from the prior art for spectroscopy, and in particular Raman spectroscopy, and the optomechanical elements represented in FIG. 1C can be adapted accordingly.

As before, in operation, the sighting path 150 makes it possible to generate a sighting image in surface reflection of the sample S with a larger field than the field of view of the microscope objective. Moreover, an image element which indicates the position of the detection pattern of the microscopic analysis path is represented on the sighting image, it being possible for the detection pattern to be a point, a line or a surface. It is thus possible for a user, for example a practitioner, to precisely identify the field of the microscopic analysis in the wide-field sighting image. In each of the examples illustrated in FIG. 1A, 1B or 1C, the splitter element 145 configured to separate the sighting path 150 and the microscopic analysis path 140 is arranged to transmit a beam, emitted by the sample in response to said illumination of the sample by the illumination device 158 of the sighting path, toward the two-dimensional detector 155 and to reflect a beam, emitted by the sample in response to said illumination of the sample by the illumination path 120 of the microscopic analysis path, toward the detection path 140. Of course, it would be possible to make the splitter element 145 work in reflection on the sighting path and in transmission on the microscopic analysis path. Moreover, when the microscopic analysis path comprises a scanning device (143, FIGS. 1A-1C), the beam splitter element may form part of the scanning device.

Whether in one or other of the configurations, the splitter element can be configured to limit the light power in the sighting path 150 of the light coming from the illumination path 120 of the microscopic analysis path and reflected by the sample. Indeed, the light, for example coming from a laser source, can be powerful and likely to cause glare in the sighting path. Thus, it is possible to use a splitter element with a reflection coefficient different from the transmission coefficient (for example a glass slide). To reduce the light power in the sighting path, it is also possible to add an optical density in the sighting path 150 (downstream of the splitter element 145).

In the case where the spectral band of the illumination source 121 of the illumination path 120 of the microscopic analysis path is at least partially different from the spectral band of the illumination device 158 of the sighting path, it will be possible for the splitter element to further comprise a dichroic element, for example a plate or a dichroic cube.

It is also possible to provide means for reducing the light power in the sighting path, these means for reducing the light power possibly containing a spectral filtering element when the spectral band of the illumination source 121 of the illumination path 120 of the microscopic analysis path is at least partially different from the spectral band of the illumination device 158 of the sighting path.

It is also possible not to activate the illumination of the sighting and microscopic analysis paths continuously, in the event that illumination of one of the paths could interfere with detection on the other path.

Thus, in practice, the microscopic analysis of the sample and the formation of a sighting image can be carried out continuously. This is the case when the image element is directly the image, formed by the wide-field imaging device of the sighting path, of the illumination pattern of the microscopic analysis path. This may also be the case when the image element is a graphic element indicating the position of the detection pattern and when the illumination of the microscopic analysis path does not interfere with the detection of the sighting path, for example because it is greatly attenuated in the sighting path, and reciprocally.

In other exemplary embodiments, the method can comprise a first step of formation of a sighting image of the sample with the illumination of the microscopic analysis path turned off, the detection of an analysis zone of interest in the sighting image of the sample, then the microscopic analysis of the sample in said zone of interest, for example by moving the sample in order to bring the graphic element, previously calibrated to indicate the detection zone, to the level of the analysis zone of interest.

This configuration is of interest in the case where the illumination of the microscopic analysis path may interfere with detection in the sighting path.

In some cases, the sighting channel can operate continuously, both for illumination and for acquisition, if the illumination of the sighting path does not interfere with the detection of the microscopic analysis path. This makes it possible to have a continuous sighting image, even if it is degraded during the time when the illumination of the microscopic analysis path is activated.

In other cases, the illumination of the sighting path can be turned off during the microscopic analysis of the sample, for example when the illumination of one path interferes with the detection on the other path and it is not possible to simultaneously maintain the illumination on both paths in order to obtain usable results.

Figure 2:
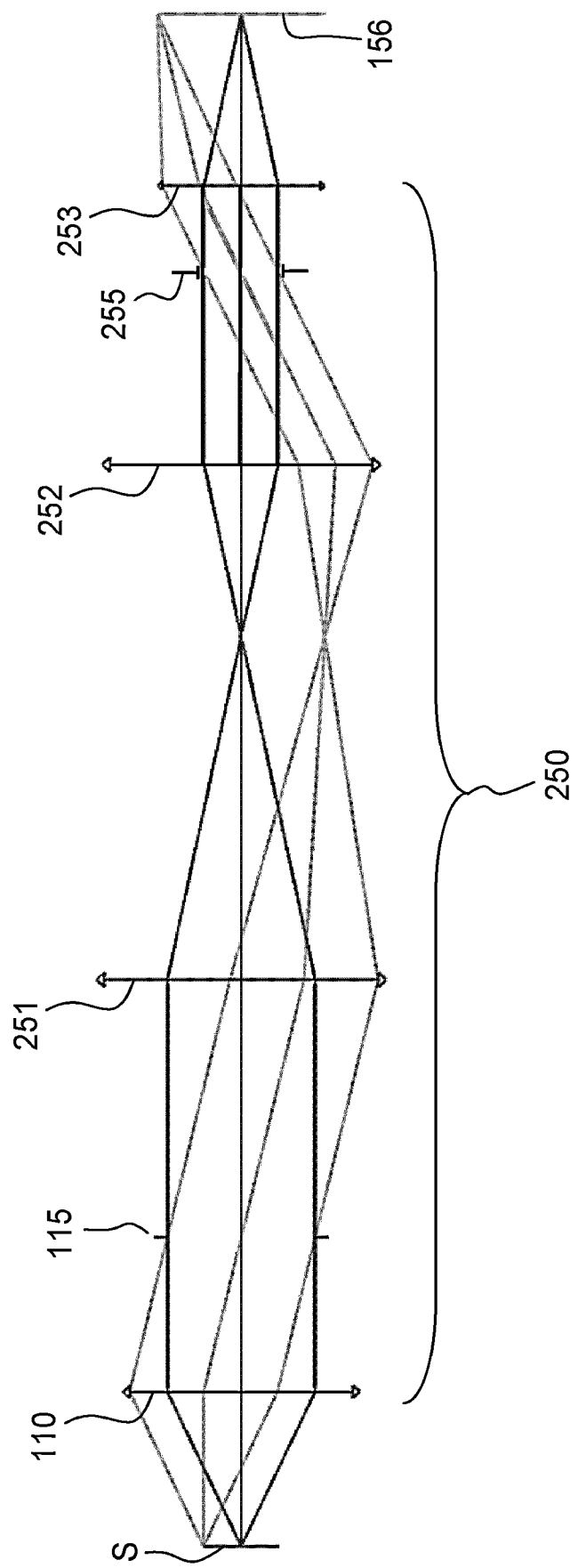
FIG. 2: a diagram illustrating an example of a sighting path of a system for microscopic analysis of a sample according to the present description.

FIG. 2 shows a diagram which illustrates an example of a sighting path of a system for microscopic analysis of a sample according to the present description. The sighting path shown in FIG. 2 is in particular configured to operate with any of the systems shown as examples in FIG. 1A, 1B or 1C. In FIG. 2, only the detection part of the sighting path is shown, the illumination possibly comprising, as illustrated in FIGS. 1A to 1C, a set of light sources arranged on the distal part of the microscope objective, or any other device for full-field illumination of the sample S.

As is illustrated in FIG. 2, the sighting path comprises the microscope objective 110, of which the exit pupil is indicated by reference sign 115, and a two-dimensional detector, represented in FIG. 2 by a detection area 156, and an objective 253.

In this example, the sighting path further comprises a tube lens 251 and an eyepiece 252. These imaging elements form, together with the objective 253 and the microscope objective 110, a full-field imaging device 250 configured to optically conjugate a given effective field of the sample encompassing said field of view with the area of detection 156 of the two-dimensional detector.

Thus, unlike certain systems known from the prior art and in particular [Ref. 8], which describes a micro-camera integrated in the object space of the microscope objective, the sighting path according to the present description, by virtue of being moved apart from the object space, makes it possible to form a sighting image in surface reflection of a field of the sample, called the effective field in the present description, which includes the field of view of the microscope objective, the sighting image being able to have a very good optical quality without affecting the object space of the objective. The dimensions of the effective field are limited by the full-field imaging device of the sighting path. The effective field can be defined by a circle with a diameter of between about 2 mm and about 5 mm.

To further improve the optical quality of the sighting image, it is advantageous for the full-field imaging device to have a numerical aperture, measured in the object space of the microscope objective, strictly lower than the nominal numerical aperture of the microscope objective.

Indeed, in a conventional microscopic analysis path, it is known to use a microscope objective with a high numerical aperture (NA), for example an NA of between about 0.5 and about 1.25. This numerical aperture is guaranteed by the manufacturer for a nominal field, called the field of view in the present description, which can be between about 500 µm and about 1.5 mm.

However, because the microscope objective 110 is not used in the sighting path under nominal conditions of use, the resolution accessible at the level of the sighting path may differ from the one announced in the specifications of the objective. In particular, by using the microscope objective with an effective field greater than the nominal field of view, aberrations and/or vignetting may adversely affect the quality of the image. In order to obtain a better image quality for the sighting path, it is therefore possible to design a full-field imaging device which has a numerical aperture strictly lower than the nominal numerical aperture of the microscope objective, for example a numerical aperture of between about 0.05 and 0.1.

An originality of the microscopic analysis system according to the present description is thus to be able to use the same microscope objective in two different optical paths, with possibly different numerical apertures: in the microscopic analysis path in which the microscope objective is used under nominal conditions (high numerical aperture, high resolution and low field), and in the sighting path in which the microscope objective is combined with other optical elements to form a full-field imaging device which optionally has a lower numerical aperture, for example about 0.08, a lower resolution and a wide field. The microscopic analysis system according to the present description can thus be seen as two microscopes operating in parallel via a single microscope objective.

In practice, the numerical aperture of the full-field imaging device 250 of the sighting path can be limited by placing a diaphragm 255 in the sighting path, for example in a plane substantially conjugate with a plane of the exit pupil 115 of the microscope objective.

Figure 3A:
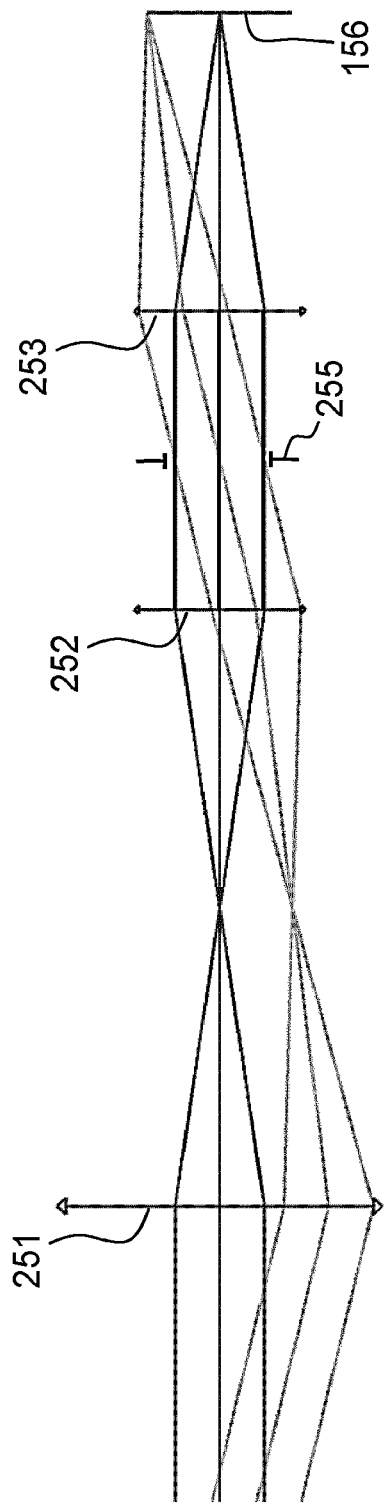
FIG. 3A: a diagram illustrating a first example of a device for full-field imaging of a sighting path of a microscopic analysis system according to the present description.
Figure 3B:
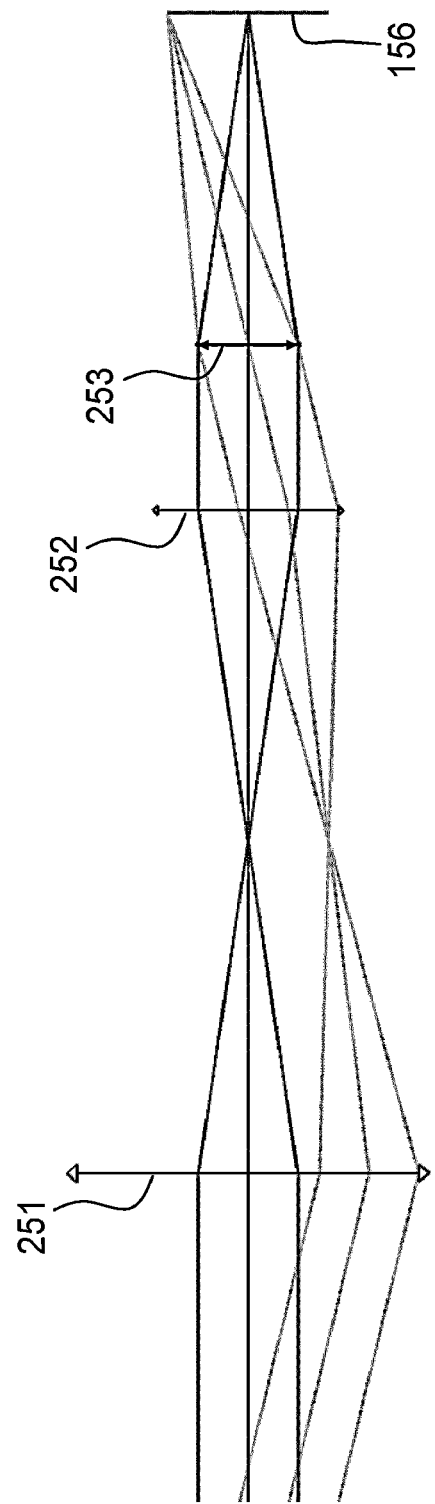
FIG. 3B: a diagram illustrating a second example of a device for full-field imaging of a sighting path of a microscopic analysis system according to the present description.

FIGS. 3A and 3B thus illustrate two examples for the reduction of the numerical aperture of the full-field imaging device 250. In these examples, the microscope objective 110 is not shown.

FIG. 3A shows a diagram illustrating a first example in which the sighting path comprises a diaphragm 255 making it possible to limit the numerical aperture of the full-field imaging device.

FIG. 3B shows a diagram illustrating a second example in which the numerical aperture of the full-field imaging device 250 of the sighting path is limited by one of the optical elements of the full-field imaging device, in this example the objective 253 of the camera. This configuration is particularly of interest because it makes it possible to reduce the size of the full-field imaging device 250 and thus to obtain a very compact sighting path. Of course, the numerical aperture of the full-field imaging device 250 of the sighting path could be limited by another of the optical elements of the full-field imaging device, for example the eyepiece 252. It will be noted that it is not essential for the diaphragm (255 in FIG. 3A or 253 in FIG. 3B) to be perfectly conjugate with the plane of the pupil of the microscope objective. However, if the plane of the diaphragm is substantially conjugate with the plane of the exit pupil of the microscope objective (as is shown for example in FIG. 2), this makes it possible not to lose the property of telecentricity of the microscope objective and to prevent rays from being vignetted within the microscope objective 110.

Moreover, the full-field imaging device 250 illustrates an example of the design of the sighting path, but other examples are possible. For example, the full-field imaging device 250 of the sighting path might not comprise an eyepiece 252, the camera objective 253 imaging a finite distance, or the eyepiece 252 might not return the rays to infinity. In any case, as has been explained above, it is advantageous to reduce the numerical aperture (NA) of the device 250, in the object space of the microscope objective, compared to the nominal NA of the microscope objective, whether by means of a diaphragm added in the sighting path or by means of one of the optical elements of the sighting path configured to form a diaphragm.

Moreover, the full-field imaging device of the sighting path can also be adjustable in focus. This makes it possible to form a sighting image in surface reflection of the sample even when the microscopic analysis path is configured to form an image deep in the sample (case of OCM imaging as illustrated in FIG. 1B for example).

Indeed, when the microscopic analysis path is an LC-OCT path for example, the microscope objective 110 is caused to be translated vertically, that is to say along its optical axis. The translation can be dynamic in a mode of vertical scanning of the illumination line (obtaining B-scans), that is to say in a direction parallel to the optical axis of the microscope objective, or controlled by the user in a mode of horizontal scanning of the illumination line, that is to say in a direction contained in a plane perpendicular to the optical axis of the microscope objective (obtaining C-scans). In the sighting path, however, it is desired that the microscope objective continues to image the surface of the sample, for example the surface of the skin, which remains at the same position when the microscope objective is translated. In order to maintain optimal image quality for the sighting image, it may therefore be useful to be able to modify the focusing of the wide-field imaging device 250 of the sighting path in order to maintain an optical conjugation between the surface of the sample S and the detection area 156 (FIG. 2).

To do this, it is possible to provide for one of the optical elements, for example the objective 253, a lens with variable focal length, or to provide that this objective can be moved, for example using a piezoelectric motor, the detection area being held fixed. In practice, the adjustment of the focusing can be automatic (autofocus), which makes it possible to limit the adjustments that have to be made by the user. However, when the sample is the skin for example, there are not always enough clear structures to allow the autofocus be performed in an effective way. Another possibility is then to calibrate the adjustable focusing of the wide-field imaging device 250 of the sighting path in such a way as to associate the correct focusing position with each position of the microscope objective within its travel.

Figure 4:
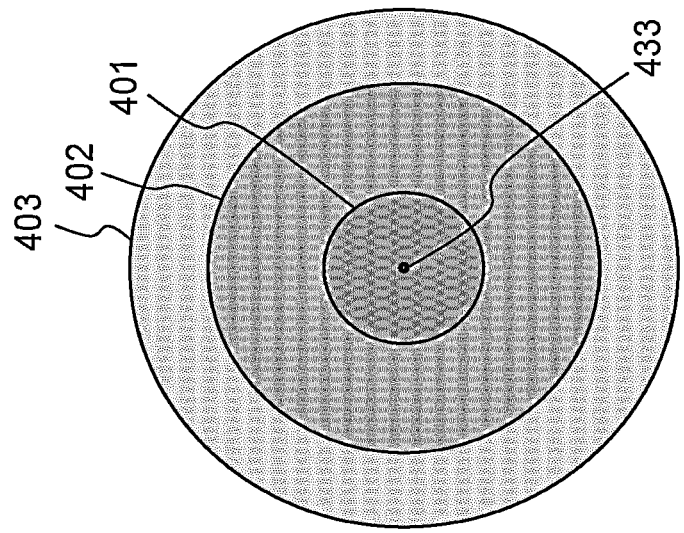
FIG. 4: a diagram illustrating different examples of a field of view, an effective field and a total field of the microscope objective, and also different detection patterns.
Figure 4:
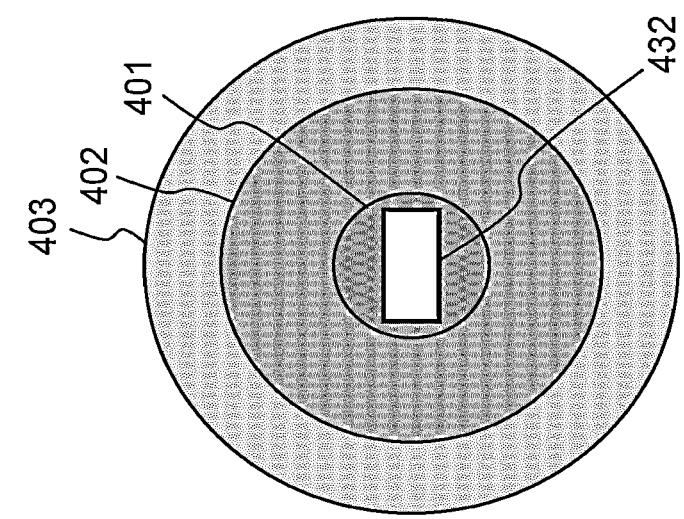
Figure 4:
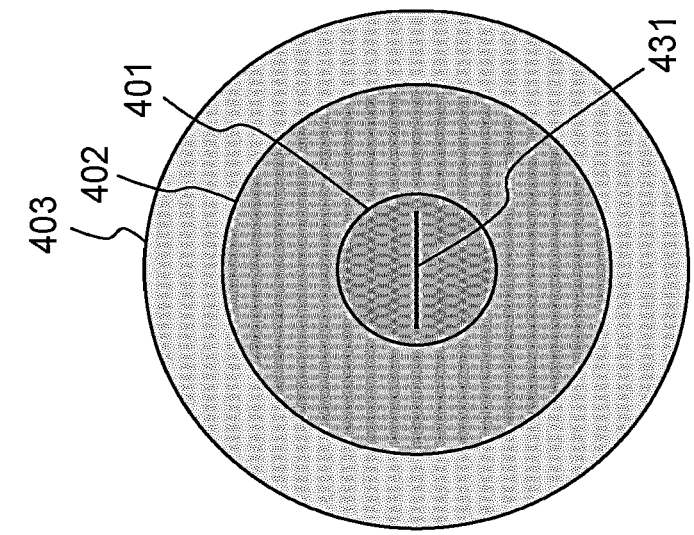

FIG. 4 shows, by way of illustration, various examples showing the field of view 401 of the microscope objective 110, for which a nominal numerical aperture is guaranteed by the manufacturer, the effective field 402 of the sighting path, and a total field 403 of the microscope objective. The total field of the microscope objective is a region of a focal plane of the microscope objective comprising all the points from which a light ray can be collected by the objective. In practice, the effective field 402 is chosen to be large enough to obtain a wide-field sighting image, but smaller than the total field in order to keep a sighting image of sufficient optical quality.

On these three examples are shown three detection patterns of the microscopic analysis path, namely a line 431, a surface 432, and a point 433. In all cases, the detection pattern is included in the field of view of the microscope objective.

A method for microscopic analysis according to the present description can be implemented by means of a microscopic analysis system as described, for example and in a nonlimiting manner by means of one of the systems 101, 102, 103 described with reference to FIGS. 1A, 1B and 1C respectively.

The method comprises the microscopic analysis of the sample S, for example a biological tissue such as skin, by means of a microscopic analysis path 140 as described for example with reference to FIG. 1A, 1B or 1C, and the formation of a sighting image of the sample by means of a sighting path 150 as described for example with reference to FIGS. 1A-1C and FIGS. 2 and 3A-3B above. The sighting image is a reflection image of an effective field 402 (FIG. 4) of the sample comprising the field of view 401, as has been explained above.

The method for microscopic analysis according to the present description further comprises the display, on the sighting image, of an image element indicating the position of the detection pattern (for example a detection pattern 431, 432 or 433 as shown in FIG. 4). In exemplary embodiments of a method according to the present description, the image element can be directly the image formed, by the wide-field imaging device of the sighting path, of the illumination pattern formed on the sample by the illumination path 120 of the microscopic analysis path 140 (see FIGS. 1A, 1B and 1C).

However, in certain exemplary embodiments, the image element can be a graphic element indicating the position of the detection pattern and determined by means of a prior calibration step.

This configuration is particularly advantageous especially when the illumination pattern is not detected by the detector of the sighting path, for example either because the detector of the sighting path is not sensitive in the spectral band of the illumination source of the microscopic analysis path, or because the first spectral band is cut in the sighting path in order to limit glare. This configuration is also advantageous when the illumination pattern is difficult to identify in the sighting image, or if the detection pattern is substantially different from the illumination pattern.

Figure 5A:
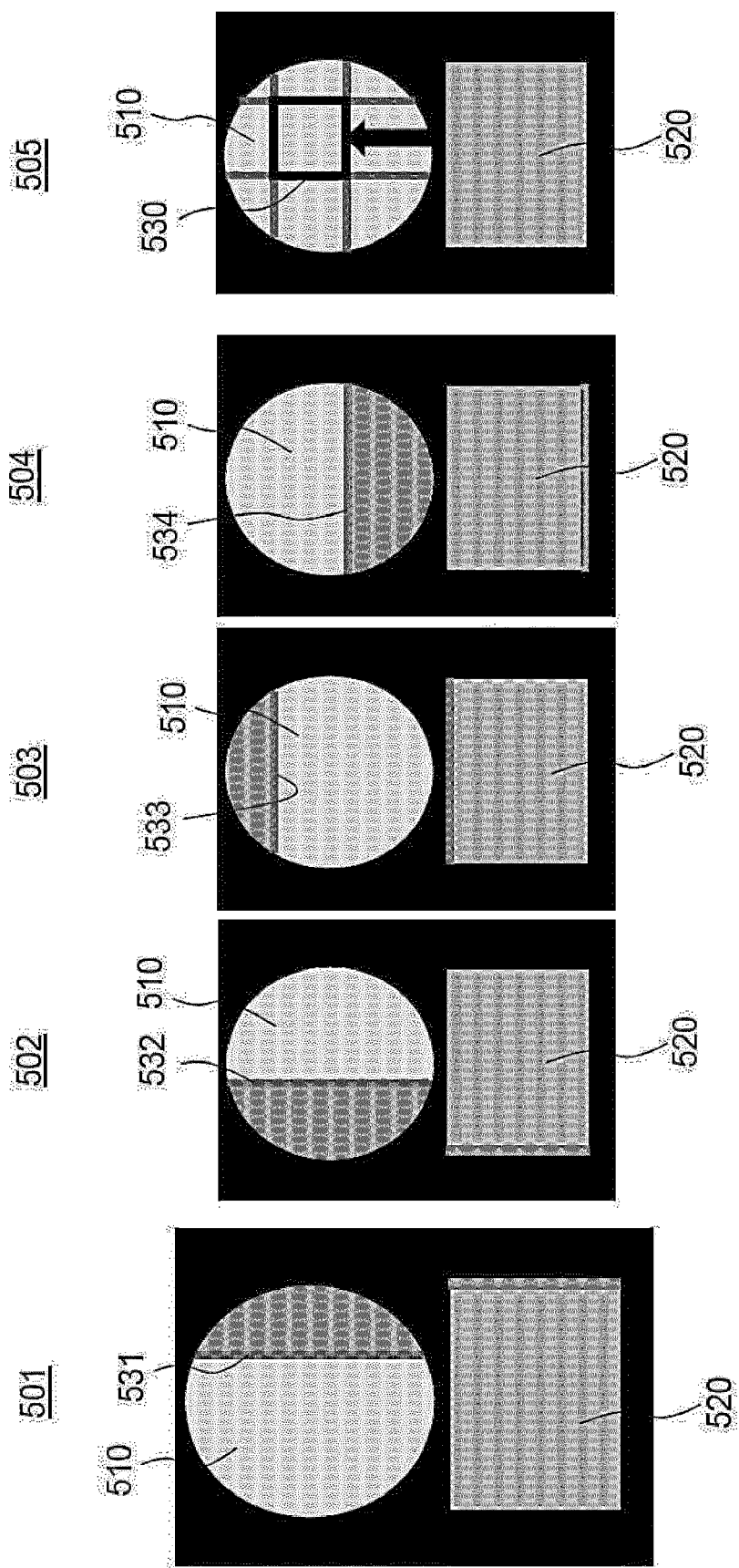
FIG. 5A: diagrams illustrating calibration steps for determining, for said image element, a graphic element indicating the position of said detection pattern, according to an example applied to microscopic imaging.

FIG. 5A thus shows diagrams illustrating, according to a first exemplary embodiment applied to microscopic imaging, calibration steps for determining, for said image element, a graphic element indicating the position of the detection pattern of the microscopic imaging path, in this example a detection pattern formed of a rectangular surface. The calibration method is implemented with a calibration sample which has a sharp edge, for example the edge of a glass slide cut "at right angles", or the edge of a pattern printed by photolithography on a glass slide.

A first step 501 involves acquisition of a sighting image 510 of the calibration sample and a microscopic en-face image 520 such that a sharp edge of the sample visible on the sighting image is visible on an edge of the microscopic image 520, in this example a right edge. The line 531 of the sighting image is then recorded as being the right edge of the detection area of the microscopic analysis path. The method is repeated in a second step 502 by moving the sample so that this time the sharp edge of the sample is situated on another side of the microscopic image, in this example the left edge. In the same way, the image 532 of the sighting image is recorded as being the left edge of the detection area of the microscopic analysis path. The method is repeated in steps 503, 504 in the same way, each time moving the sample in order to make the sharp edge appear on a new side of the microscopic image 520. A corresponding line 534, 535 is recorded each time on the sighting image. As is illustrated in diagram 505, starting from the 4 lines recorded on the sighting image, it is possible to reconstruct a graphic element which indicates the position of the detection pattern, in this example a rectangular surface which can be materialized by a rectangle on the sighting image during the acquisition of a microscopic image. The calibration thus makes it possible to perfectly identify the detection pattern of the microscopic analysis path in the sighting path, and this independently of the sample that is analyzed. The calibration can be adapted to a line or point detection pattern.

Figure 5B:
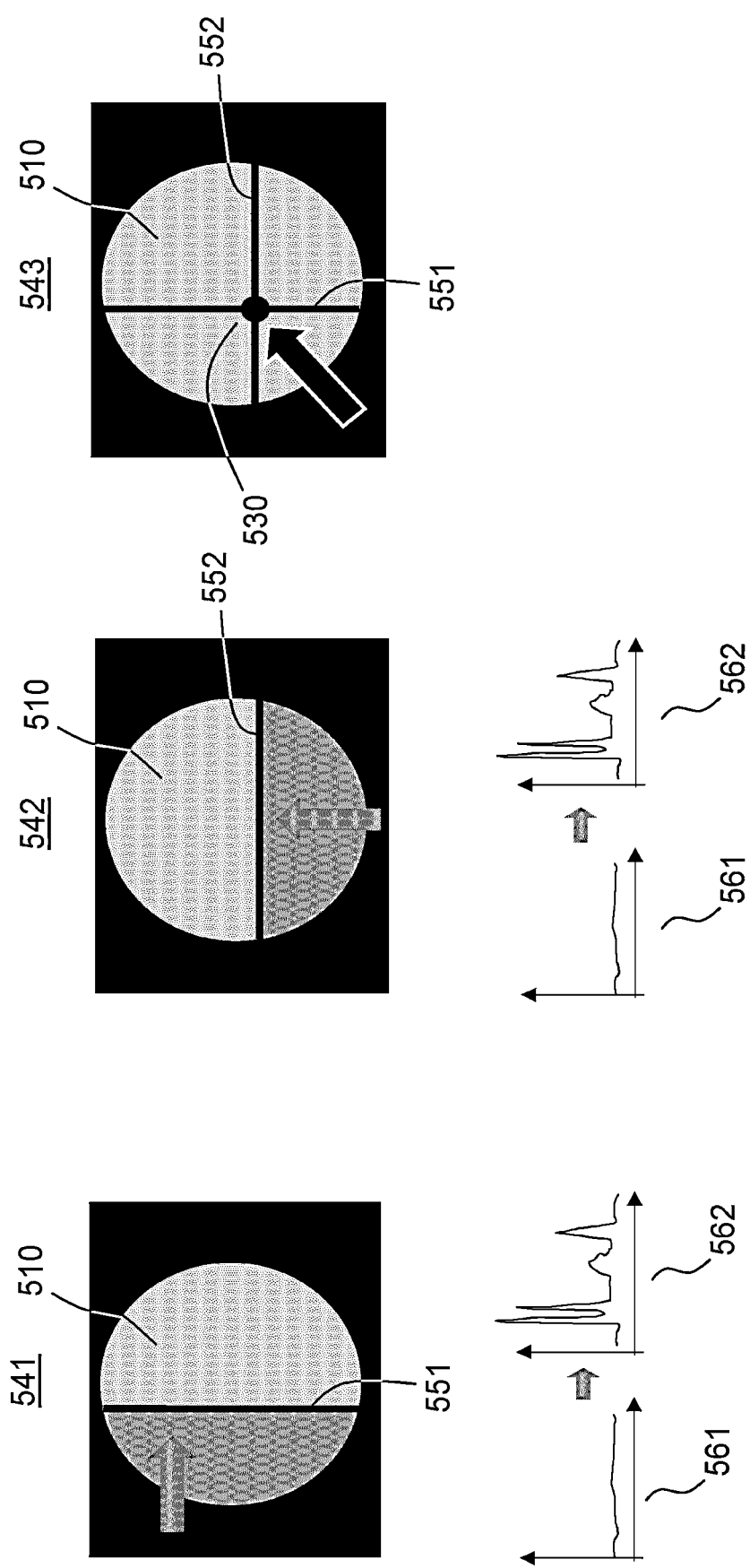
FIG. 5B: diagrams illustrating calibration steps for determining, for said image element, a graphic element indicating the position of said detection pattern, according to an example applied to spectroscopic analysis.

FIG. 5B shows diagrams illustrating, according to a second example applied to spectroscopic analysis, for example Raman spectroscopic analysis, calibration steps for determining, for said image element, a graphic element indicating the position of the detection pattern, in this example a detection point.

In a first step 541, a sighting image 510 of the calibration sample is acquired, and a Raman signal (561) is measured at the same time.

The reference sample is moved, for example from left to right, until a strong Raman signal (562) is observed. This corresponds to a first sharp edge of the calibration sample 551 that is recorded. The method is repeated in a second step 542 by moving the calibration sample, for example from bottom to top, until again a strong Raman signal appears (spectrum 562). This corresponds to a second sharp edge of the calibration sample 552 that is recorded. As is illustrated in step 543, starting from the two straight lines 551, 552 recorded, it is possible to determine a graphic element representative of the detection pattern 530 (here a disk centered on the detection point) and positioned at the intersection of the two straight lines. It is possible to ensure the precision of the calibration by repeating the steps 541, 542 but by going, for example, from right to left and then from top to bottom. The calibration thus makes it possible to perfectly identify the detection pattern of the microscopic analysis path in the sighting path, and this independently of the sample analyzed.

In practice, a method for the microscopic analysis of a sample, for example the analysis of the skin of a patient, can be carried out in the following way by a practitioner, for example a dermatologist, by implementing the steps of a method according to the present description.

In a first step, a visual examination of the skin is carried out. Clinical images (photos) can be taken in order to locate "suspect" structures on a body scale. A dermoscopic examination follows. The dermatologist takes images of the suspect structure using a magnifying optical system, for example a dermatoscope, which optically corresponds to a magnifying glass, either digital or non-digital, with integrated illumination. The field of view of the dermatoscope is typically 1 to 3 cm. Dermoscopic images can be recorded directly with a digital dermatoscope or with the aid of a camera.

If any doubt persists during the dermoscopic examination, the dermatologist proceeds to a microscopic analysis of the skin, for example by means of a system as illustrated in FIG. 1B, for example with a microscopic analysis path of the LC-OCT type. The dermatologist positions the manual probe head (that is to say the part of the system in contact with the skin for imaging) as close as possible to the suspect structure. He then moves the whole probe (while keeping it in contact with the skin) until he precisely locates the lesion previously identified in dermoscopy, being guided by the sighting path.

Once the structure is identified on the sighting image, the dermatologist proceeds to analyze the skin at the cellular level and in depth by virtue of the LC-OCT microscopic analysis path.

The examination begins, for example, with the vertical section imaging mode (B-scan), which gives access directly to the entire depth of the structure. By virtue of the image element displayed on the macro image indicating the position of the detection pattern (a line in the case of the cross-sectional imaging mode), the practitioner knows perfectly at what level in the structure he is in the process of observing a vertical section at the cellular scale.

The dermatologist may also be interested in the LC-OCT image in order to search for pathological markers at the cellular level/deep within the skin, in order to enrich the information already obtained by dermoscopy. At this stage, it is possible to move around in the structure in order to look for these pathological markers or to study them.

This movement can be done in two ways. Laterally by virtue of the scanning device (143 in FIG. 1B) present in the device, which makes it possible to scan the detection pattern. The amplitude of this scan is quite low (~500 µm), and in only one direction. The second way is to move the whole probe or the skin under the probe. This displacement will a priori be less fine (its precision will depend on the control that the user is able to exercise), but the dermatologist will have as much amplitude as he wishes to target any zone in LC-OCT. For this type of movement, the sighting image is important because it allows the dermatologist to ensure that he always remains at the level of the structure during his action in moving the probe or the skin.

Once the markers have been identified by LC-OCT, several options are possible. The dermatologist can switch to horizontal section mode (C-scan or en-face) in order to enrich his understanding of the structure (with the same approach to navigating the structure as in vertical section mode).

It is also possible to acquire information within a volume of the sample in order to study pathological markers in 3D in a zone of interest. Following the acquisition of one or more volumes, the dermatologist can stop the acquisition system and study the volumes acquired for analysis. It should be noted that the recording of a volume is accompanied by the recording of a certain number of sighting images acquired during the 3D acquisition (similarly, the recording of any image/video is accompanied by the recording of the associated sighting image/video). Several sighting images are recorded during a 3D acquisition in the case where the practitioner has moved during the acquisition (3D acquisitions can be relatively long).

Figure 6A:
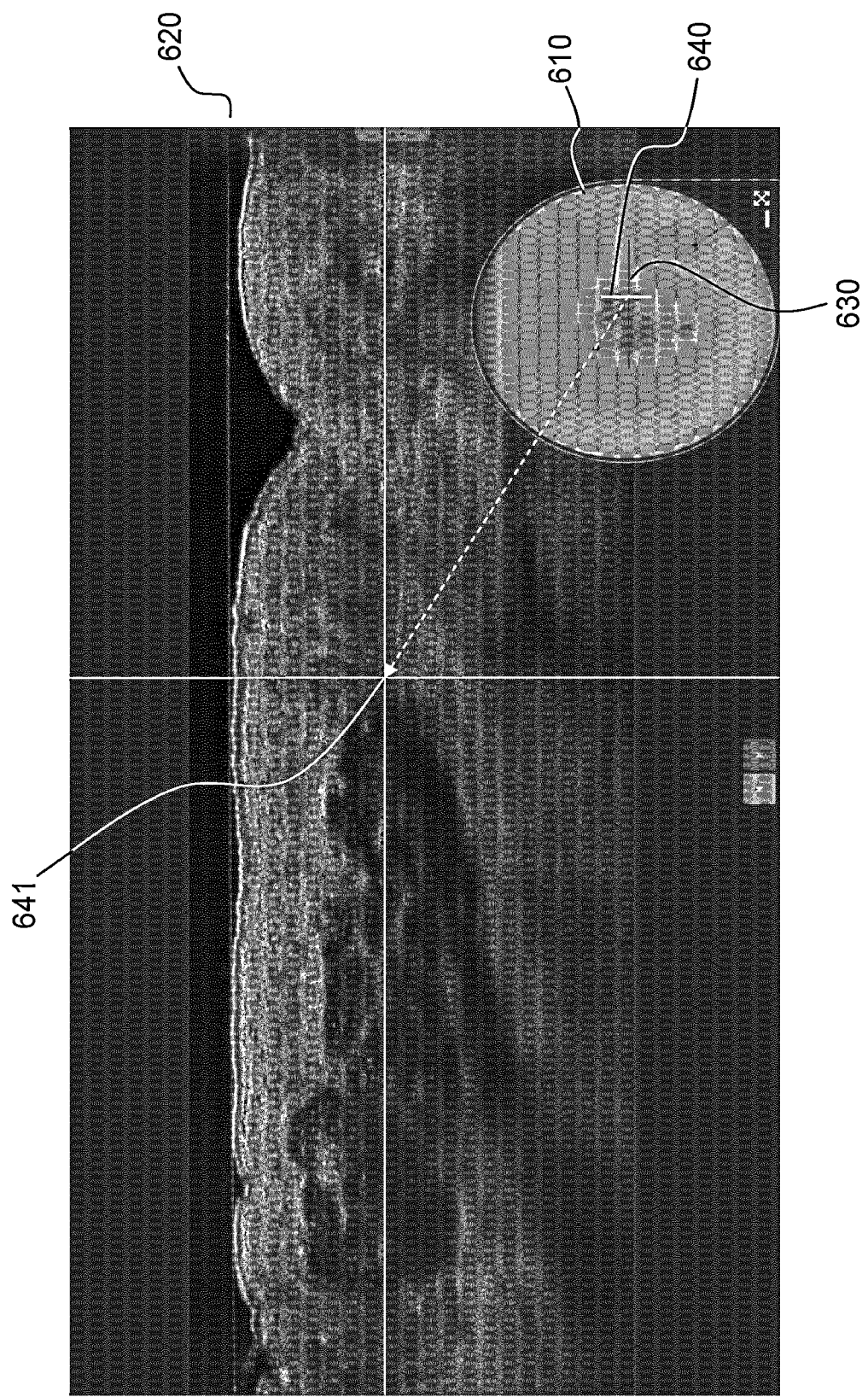
FIG. 6A: a first image illustrating an example of the display of a sighting image and a microscopic image (B-scan) obtained by means of a method according to the present description.
Figure 6B:
FIG. 6B: a second image illustrating the same example of the display of a sighting image and a microscopic image (B-scan) obtained by means of a method according to the present description.
Figure 7:
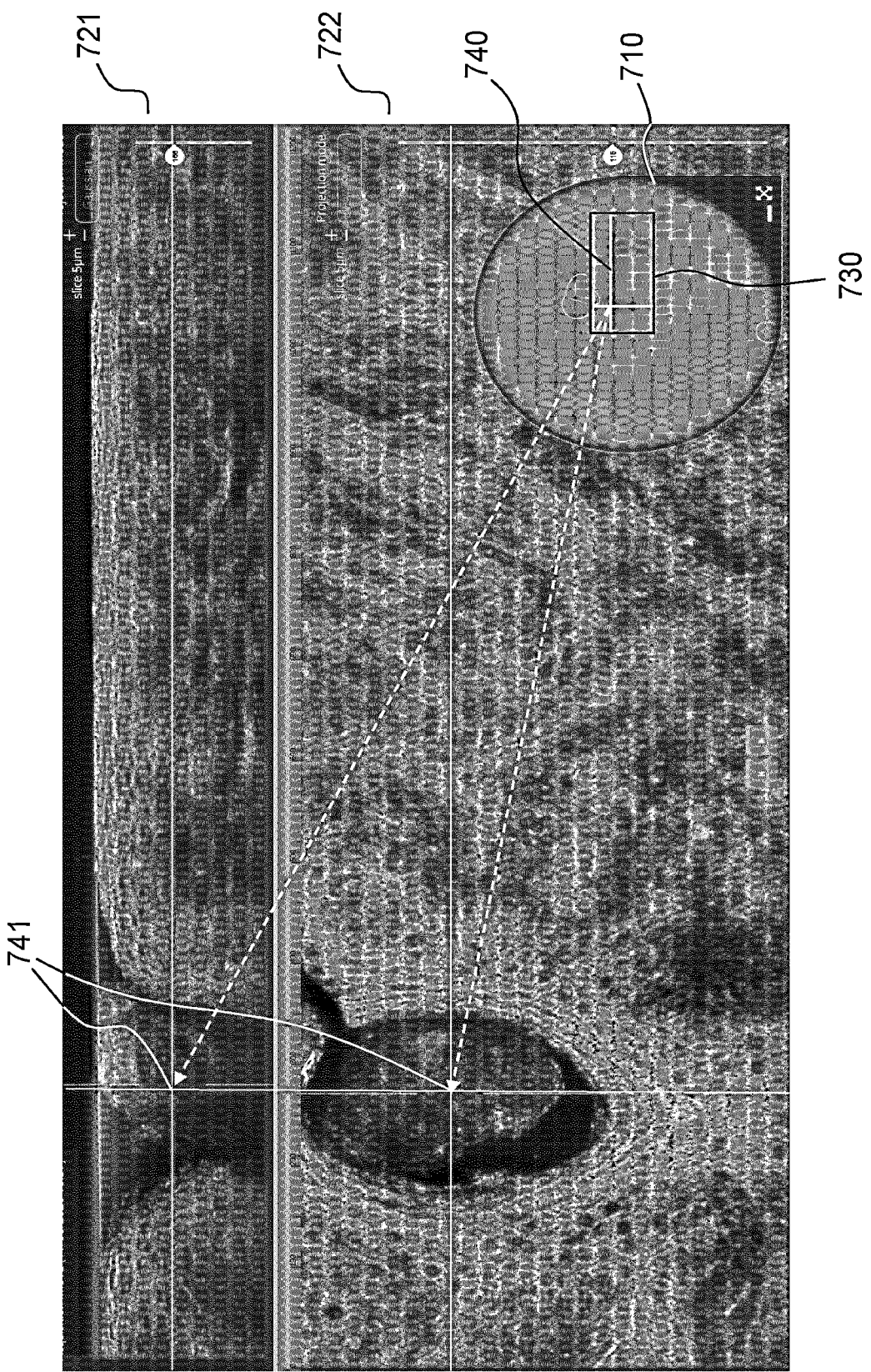
FIG. 7: images illustrating an example of the display of a sighting image and microscopic images (B-scan and C-scan) obtained by means of a method according to the present description.

FIGS. 6A, 6B and 7 show images illustrating examples of sighting images and microscopic B-scan and C-scan images recorded during an acquisition of a volume by means of a method according to the present description. In these examples, the microscopic analysis path is an LC-OCT type analysis path, as shown for example in FIG. 1B, configured for acquisition of 3D images. To obtain these images, the source used (121 in FIG. 1B) is a supercontinuum laser filtered by an optical fiber for an emission at about 800 nm and collimated by an off-axis parabolic mirror. The microscope objective 110 is an objective immersed in silicone oil with 20× magnification and a numerical aperture NA=0.5. A cylindrical lens 122 with a focal length of 50 mm permits illumination along a line of ~1.5 mm×1.5 µm at skin level, with a power of ~10 mW. A galvanometric scanner (143 in FIG. 1B) is used for lateral scanning of the illumination line. The fold mirror 142 is mounted on a piezoelectric actuator for the modulation of the interferences for the generation of the C-scan images. A microscope objective 133 identical to objective 110 is used in the reference arm for dispersion compensation. The reference surface 135 of the interferometer is an air/glass interface of a glass slide made of fused silica. The tube lens 131 has a focal length of 150 mm, and detector 138 comprises a CMOS line-scan camera. A 90:10 splitter plate (145) is mounted on the scanning device 143 in order to separate the microscope and sighting paths. The sighting path 150 comprises a camera 155 equipped with miniature optics of a few mm, serving as a diaphragm, as described in FIG. 3B. The camera is equipped with focus/autofocus adjustment.

FIGS. 6A and 6B thus illustrate, by way of example, a B-scan image 620 displayed with a sighting image 610. On the sighting image 610, the graphic element 630 indicates the position of the detection pattern (line) of the microscopic analysis path. The graphic element is determined by virtue of a prior calibration, as described for example with reference to FIG. 5A.

A marker 640 can further be superimposed on the sighting image 610 in order to mark a point on the graphic element, or more generally on the image element, so as to allow a user to target a point in the B-scan image 620 and to visualize the position of the point thus targeted at the level of the surface of the sample on the sighting image. For example, the targeted point in the image 620 is indicated by a reticle 641. The marker is calibrated to position itself at the level corresponding to the position of the targeted point via the reticle, projected onto the surface of the sample. Similarly, it is possible to leave the possibility to the user of targeting a point in the sighting image, within the detection pattern, directly via the marker 640, so as to visualize to which position corresponds a point of the detection pattern within the B-scan image (marked in this case by the vertical axis of the reticle).

FIG. 6B illustrates the same image with movement of the marker 640 and of the reticle 641, the user being able either to move the reticle 641 so as to see the marker reposition itself on the sighting image 610, or to move the marker 640 so as to see the reticle reposition itself on the B-Scan image 620.

FIG. 7 shows two images extracted from a volume, namely a B-scan image 721 and a C-scan image 722. The sighting image 710 is displayed at the same time with a detection pattern 730 corresponding to a detection surface of the C-scan.

Just as in the case of the B-scan image (FIG. 6A and FIG. 6B), a marker 740 can be superimposed on the graphic element of the sighting image, or more generally on the image element. The marker is calibrated so as to be able to associate a point of the volume, marked here by a reticle 741, with a point of the detection pattern marked by the marker, at the level of the surface of the sample.

The user can then target a point via the marker 740, respectively via the reticle 741, so as to visualize to which position corresponds a point of the volume projected onto the surface of the sample, within the detection pattern, respectively to which position corresponds a point of the detection pattern within the volume, marked in this case by the axes of the reticle that can be viewed in the C-scan images extracted from the volume.

As is illustrated in these images, the method according to the present description allows the practitioner to precisely identify the field of the microscopic analysis (in this example B-scans and C-scans) in the sighting image, which has an image quality close to the quality of a dermoscopic image.

Although described through a number of exemplary embodiments, the method and the system for microscopic analysis according to the present description include variants, modifications and improvements which will be obvious to a person skilled in the art, it being understood that these variants, modifications and improvements form part of the scope of the invention as defined by the claims that follow.

REFERENCES

Ref. 1: M. Rajadhyaksha et al, "*In vivo confocal scanning laser microscopy of human skin II: Advances in instrumentation and comparison with histology*", J Invest Dermatol, 1999.

Ref 2: K. König et al, "*High-resolution multiphoton tomography of human skin with subcellular spatial resolution and picosecond time resolution,*" J. Biomed. Opt. 8, 432-439 (2003).

Ref. 3: Schmitt et al., "*Subsurface Imaging of Living Skin with Optical Coherence Microscopy*", Dermatology 1995; 191:93-98.

Ref 4: Published patent application WO2015092019.

Ref. 5: Y. Chen et al. "*High-resolution line-scanning optical coherence microscopy*", Optics Letters, vol. 32, no. 14, 1971-1973 (2007).

Ref. 6: J. Schleusener et al., "*Raman spectroscopy for the discrimination of cancerous and normal skin*", Photon Lasers Med (2015).

Ref 7: E. Drakaki et al. "*Spectroscopic methods for the photodiagnosis of nonmelanoma skin cancer*", Journal of Biomedical Optics 18(6), 061221 (June 2013).

Ref. 8: Published patent application WO2017139712.

Ref. 9: Granted U.S. Pat. No. 7,864,996.

Ref 10: Z. Wu et al. "*Precise in vivo tissue micro-Raman spectroscopy with simultaneous reflectance confocal microscopy monitoring using a single laser*", vol. 44, no. 6/15 Mar. 2019/Optics Letters.

Ref. 11: E. Beaurepaire et al. "*Full field optical coherence microscopy*" Opt. Lett. 23, 244-246 (1998)

The invention claimed is:

1. A system for microscopic analysis of a sample (S), comprising:
   a microscopic analysis path comprising:
      a microscope objective of given nominal numerical aperture (NA) in a given field of view;
      an illumination path configured to illuminate the sample through the microscope objective according to a first illumination pattern and in a first spectral band;
      a detection path comprising said microscope objective, said detection path being configured to detect in said field of view, and according to a detection pattern, a light beam emitted by the sample in response to said illumination of the sample, and to generate a detection signal;

a processing unit configured to generate information on microscopic analysis of the sample from said detection signal;

a sighting path comprising:
said microscope objective;
a full-field illumination device configured to illuminate the sample in a second spectral band;
a two-dimensional detector;
one or more imaging elements forming, with said microscope objective, a full-field imaging device configured to optically conjugate a given effective field of the sample encompassing said field of view with a detection area of the two-dimensional detector, and to form a sighting image in surface reflection of said effective field;

a beam splitter element arranged upstream of the microscope objective in order to separate the analysis path and the sighting path;

a display module configured to show said sighting image and, on said sighting image, an image element indicating the position of said detection pattern.

2. The system for analysis of a sample as claimed in claim 1, in which the full-field imaging device has, in the object space of the microscope objective, a numerical aperture strictly less than the nominal numerical aperture of the microscope objective.

3. The system for analysis of a sample as claimed in claim 2, in which said sighting path further comprises a diaphragm for limiting said numerical aperture of the full-field imaging device.

4. The system for analysis of a sample as claimed in claim 1, in which the full-field imaging device of said sighting path is adjustable in focus.

5. The system for analysis of a sample as claimed in claim 1, in which the full-field illumination device of the sighting path comprises a plurality of light sources arranged on a periphery of a distal face of the microscope objective.

6. The system for analysis of a sample as claimed in claim 1, in which said second spectral band differs at least partially from said first spectral band, and said sighting path comprises means for reducing the light power at least in said first spectral band.

7. The system for analysis of a sample as claimed in claim 1, in which said second spectral band differs at least partially from said first spectral band, and said beam splitter element comprises a dichroic element configured to split the beams in each of said first and second spectral bands.

8. The system for analysis of a sample as claimed in claim 1, in which said image element indicating the position of said detection pattern comprises a graphic element determined by means of a prior calibration.

9. The system for analysis of a sample as claimed in claim 1, in which said microscopic analysis path is a confocal imaging path and/or an optical coherence tomographic imaging path, and said information on microscopic analysis of the sample comprises at least one image of the sample.

10. The system for analysis of a sample as claimed in claim 1, in which said microscopic analysis path is a spectroscopic analysis path, and said information on microscopic analysis of the sample comprises at least one spectrum of said light beam emitted by the sample at at least one point of the sample.

11. A method for analysis of a sample (S), comprising:
a microscopic analysis of the sample by means of a microscopic analysis path comprising a microscope objective of given nominal numerical aperture (NA) in a given field of view, said microscopic analysis comprising:
illuminating the sample through the microscope objective according to a first given illumination pattern and in a first spectral band;
detecting in said field of view, and according to a detection pattern, a light beam emitted by the sample in response to said illumination of the sample in order to form a detection signal;
processing said detection signal in order to generate information on microscopic analysis of the sample;
the formation of a sighting image in surface reflection of a given effective field of the sample encompassing said field of view, by means of a sighting path comprising said microscope objective, a two-dimensional detector, one or more imaging elements configured to form with said microscope objective a full-field imaging device, the formation of the sighting image comprising:
full-field illumination of the sample in a second spectral band;
optical conjugation of the effective field of the sample with a detection area of the two-dimensional detector, by means of said full-field imaging device, in order to form said sighting image;
displaying said sighting image and, on said sighting image, displaying an image element indicating the position of said detection pattern.

12. The method for analysis of a sample as claimed in claim 11, in which the microscopic analysis of the sample and the formation of a sighting image are carried out continuously.

13. The method for analysis of a sample as claimed in claim 11, comprising:
a first step of forming a sighting image of the sample without illumination of the microscopic analysis path,
the detection of an analysis zone of interest in the sighting image of the sample, and
the microscopic analysis of said sample in said zone of interest.

14. The method for analysis of a sample as claimed in claim 13, in which the illumination of the sighting path is turned off during the microscopic analysis of the sample.

15. The method for analysis of a sample as claimed in claim 11, in which the microscopic analysis of the sample comprises confocal and/or optical coherence tomographic imaging of the sample.

16. The method for analysis of a sample as claimed in claim 15, in which the microscopic analysis of the sample comprises the formation of B-scan type images with a given imaging rate, and said imaging rate is synchronized with a rate of acquisition of the sighting images.

17. The method for analysis of a sample as claimed in claim 11, in which the microscopic analysis of the sample comprises a spectroscopic analysis of the sample.

18. The method for analysis of a sample as claimed in claim 11, comprising a prior calibration step making it possible to determine, for said image element, a graphic element indicating the position of said detection pattern.

19. The method for analysis of a sample as claimed in claim 11, further comprising displaying a marker superimposed on said image element of the sighting image, said marker allowing a user to target a point of interest in the detection pattern.

20. The method for analysis of a sample as claimed in claim 11, in which the sample is a biological tissue, for example skin.

\* \* \* \* \*